3,543,607
ANGLE INPUT POWER TRANSMISSION
Jack W. Schmidt, Robert M. Tuck, and William V. Phillips, Indianapolis, Ind., assignors to General Motors Corporation, Detroit, Mich., a corporation of Delaware
Filed May 1, 1969 Ser. No. 820,723
Int. Cl. F16h 47/08
U.S. Cl. 74—688                                    7 Claims

ABSTRACT OF THE DISCLOSURE

An angle input power transmission for providing two forward speed ranges, including a converter drive and an overdrive, and a reverse speed range is disclosed. The transmission has an angle input shaft drivingly connected through a bevel gear set to a pair of input clutches. One clutch is connectable with the torque converter pump to provide a converter input planetary gear set while the other clutch provides a direct input to the planetary gear set. A turbine clutch on the output of the torque converter permits the turbine to be selectively coupled with the planetary gear set when a converter drive is desired. The converter input clutch and the turbine clutch are disengaged when the direct clutch is engaged to remove the torque converter from the power path to reduce the power loss in the transmission.

---

This invention relates to angle input power transmission and more particularly to angle input power transmission having two forward speed ranges and a reverse speed range.

Angle input power transmission commonly used for heavy-duty and multiple passenger vehicles include a converter underdrive and a direct drive. This makes the transmission very efficient for low speed driving conditions. The present invention provides an angle input power transmission which will provide more efficient operation during highway driving. In the present invention, initial startup of the vehicle is accomplished through a torque converter which provides torque multiplication from the engine to the output shaft and higher speed driving is accomplished through a planetary gear set which provides a direct drive ratio and an overdrive ratio between the input and output shaft. When either the direct drive or overdrive ratio is established, the torque converter is removed from the drive path by a pair of clutches, one of which is connected to the converter input and the other is connected to the converter output. The converter output clutch may be either a friction type clutch or a one-way type clutch. When the one-way type clutch is used, the turbine is automatically removed from the power train when the direct clutch is engaged.

The overdrive ratio in the transmission is accomplished through a direct clutch which is connected between the input shaft and the carrier member of the planetary gear set. The sun gear of the planetary gear set is connected by an intermediate shaft to a disc type brake which is forward of the converter on the opposite side of the input shaft from the planetary gear set. The ring gear of the planetary gear set provides an output member. The direct drive in the planetary gear set is accomplished by engagement of the direct clutch and a lockup clutch which is connectable between the sun and ring gears thus providing a direct connection from the bevel gearing to the output shaft. The intermediate shaft is connectable to the turbine clutch which provides a drive from the converter to the planetary gear set in forward drive and also in a reverse drive. In reverse drive, the carrier member of the planetary gear set is connected to the transmission housing through a friction type brake and thus the reverse in drive is provided from the sun gear to the ring gear of the planetary gear set.

It is, therefore, an object of this invention to provide an angle input power transmission having a converter drive, a direct drive, and an overdrive in which the converter is removed from the power path when the direct drive or overdrive are established.

Another object of this invention is to provide a transmission having planetary gear sets disposed on one side of an angle input and a torque converter and overdrive brake disposed on the other side of the angle input and dual input clutches disposed intermediate the angle input and the converter drive.

Another object of this invention is to provide in an angle input power transmission a torque converter having input and output clutches which may be disengaged to render the torque converter ineffective during a forward drive ratio.

Other objects and advantages of the present invention become apparent to those skilled in the art from the following description and drawings in which.

Figure 1:
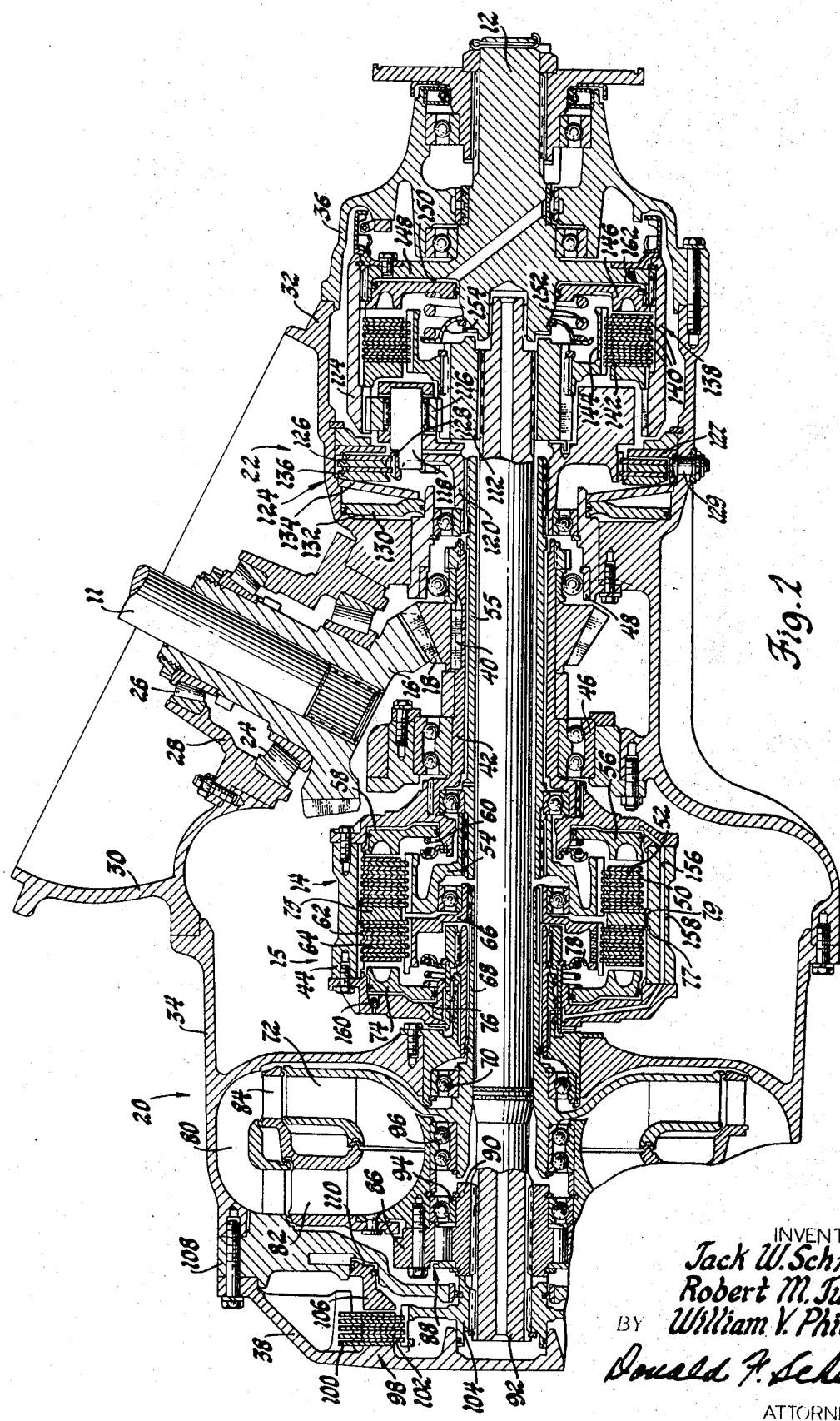
FIG. 1 is a cross-sectional view of the transmission.

Referring to FIG. 1 as shown in the transmission having an input shaft 11, an output shaft 12, a pair of input clutches 14 and 15 connected through the input shaft 11 to bevel gears 16 and 18 and a torque converter 20 connected to the input clutch 15 and a planetary gear set 22 connected to the input clutch 14. The input shaft 11 is rotatably mounted in a pair of tapered roller bearings 24 and 26 which are secured in a housing 28 which is fastened to the transmission housing 30. The transmission housing 30 has a mounting flange 32 adapted to connect the transmission to an engine, a converter housing 34, a tail shaft housing 36 and an end cover 38.

The bevel gear 18 is drivingly connected by a key 40 to a sleeve shaft 42 which is connected to the outer drum 44 of the dual input clutches 14 and 15. The sleeve shaft 42 is supported in the transmission housing by bearings 46 and 48. The input clutch 14 includes alternately spaced plates 50 and 52 which are splined to the drum 44 and a hub 54 respectively. The hub 54 is drivingly connected to an intermediate sleeve shaft 55. A clutch piston 56 is slidably disposed in the drum 44 to form a clutch apply chamber 58 such that when the apply chamber 58 is filled with fluid under pressure, the piston 56 will engage the plates 50, 52 to apply the clutch. A return spring 60 pushes the piston 56 away from the clutch plates to disengage the clutch when the chamber 58 is not pressurized. The clutch 15 includes alternately spaced plates 62 and 64 splined to the drum 44 and a hub 66 respectively. The hub 66 is connected to a converter input shaft 68 which is rotatably mounted in a bearing 70 and drives the pump member 72 of the converter 20 whenever the clutch 15 is engaged. The clutch 15 also includes an apply chamber 76 which is adapted to be filled with pressure fluid to engage the piston with the clutch plates 62, 64 thereby engaging the clutch 15. The return spring 78 pushes the piston 74 out of engagement with the clutch plates when the chamber 76 is exhausted. The clutches 14 and 15 have a common reaction plate 75 axially located in the drum 44 by a pair of snap rings 77 and 79.

The torque converter 20 includes the stator member 80 and turbine members 82 and 84 which are in toroidal flow relationship with the pump 72. The turbine members 82 and 84 are secured to the outer race 86 of a one-way clutch 88 while the inner race 90 of the one-way clutch is splined to an intermediate shaft 92. The one-way clutch 88 and the left end of shaft 92 is supported by a bearing 94 mounted on the turbine 82 which is supported by a bearing 96 on the shaft 68.

An overdrive brake 98 has friction members 100 splined to the stationary end cover 38 and alternately spaced friction members 102 splined to a hub 104 which, in turn, is splined to the intermediate shaft 92 which is adapted to provide a reaction member for the planetary gear set 22 when an overdrive ratio is selected. A piston 106 is slidably disposed in a flange member 108 to form a chamber 110 which, when pressurized, moves the piston against the friction plates 100 and 102 to engage the brake 98 thus restraining the intermediate shaft from rotation.

The opposite end of intermediate shaft 92 is secured to a sun gear 112 which is an input reaction member of the planetary gear set 22. The planetary gear set 22 also includes a ring gear 114 which is drivingly connected to a spline to the output shaft 12 to provide an output member for the planetary gear set 22, and a plurality of pinion gears 116 which mesh with the sun gear 112 and the ring gear 114 and are rotatably supported on pins 118 which are secured to a planetary carrier member 120. The carrier member 120 is splined to the intermediate sleeve shaft 55 which is also splined to the clutch hub 54. Thus, when the input clutch 14 is engaged, the carrier member 120 is driven directly by the input shaft 11 to provide an input member. The carrier member 120 is also connected with a reverse brake 124 which includes friction member 126 splined to the housing 30, through a reaction member 127 which is nonrotatably located in the housing 30 by a fastener 129, and friction members 128 which are splined to the carrier 120 to provide a reaction member when the reverse brake is engaged. The reverse brake 124 is engaged by a piston 130 which is slidably disposed in the housing 30 and cooperates therewith to provide a fluid chamber 132 and disengaged by a Belleville spring 134 which is disposed between the piston 130 and a pressure plate 136 which is splined to the reaction member 127. When the reverse brake 124 is engaged and the clutch 15 is engaged, the drive is from the input shaft 11 through the torque converter 20 to the sun gear 112 and then reversely through the planetary set 22 to the output shaft 12. Thus the carrier 120 provides another input-reaction member for the planetary gear set.

A planetary lockup clutch 138 is disposed between the sun gear 112 and ring gear 114 to provide a lockup condition and therefore a one-to-one ratio in the planetary set 22. The lockup clutch 138 includes friction discs 140 splined to the ring gear 114 and alternately spaced friction discs 142 splined to a hub 144 which, in turn, is splined to the sun gear 112. An apply piston 146 is slidably disposed in a flange 148 of the output shaft 12 and cooperates therewith to provide an apply chamber 150 which is pressurized when the clutch 138 is to be engaged. A return spring 152 is disposed between the piston 146 and a spring retainer 154 and is adapted to urge the piston to the ring to disengage the clutch 138 when the chamber 150 is not pressurized. When the lockup clutch 138 is engaged and a torque multiplication drive is desired, between the input and output shaft 12, the input clutch 15 is engaged. The converter 20 is connected to the input shaft 11 so that the inherent torque multiplication of the torque converter is used to provide the desired torque multiplication for acceleration.

The chamber 58 is adapted to be filled with fluid via passage 156. A small orifice 158 in the drum 44 vents the passage 156 in chamber 58 to atmosphere, to prevent centrifical pressure buildup which might apply the clutch 14, when the clutch is not to be engaged. The clutches 15 and 138 have ball check valve 160 and 162 respectively which operate to prevent centrifical pressure buildup in these clutches whenever they are disengaged. The restriction 158 provides a constant leak from passage 156. However, when the clutch chamber 58 is pressurized, the leakage through restriction 158 is not sufficient to reduce the pressure in the chamber 58.

The transmission provides two drive ranges in a forward direction, the one drive range being a lockup condition in the planetary set 22 and the other drive range being an overdrive in the planetary set 22. When the planetary set 22 is in the lockup condition, the input can be either directly from the input shaft 11 to the clutch 14 or from the input shaft 11 through the clutch 15 and the converter 20. Thus the torque converter is used to provide initial acceleration of the vehicle. When a low driving speed, such as city driving is established, the clutch 14 is engaged while the clutch 15 is disengaged thus permitting a direct drive from input to output with the converter out of the system to increase the efficiency of the transmission. With the clutch 14 engaged and the intermediate shaft 92 being driven at input speed because of the lockup condition in the planetary set 22, the one-way clutch 88 permits the turbine 82 to be overrun by the shaft 92.

Figure 2:
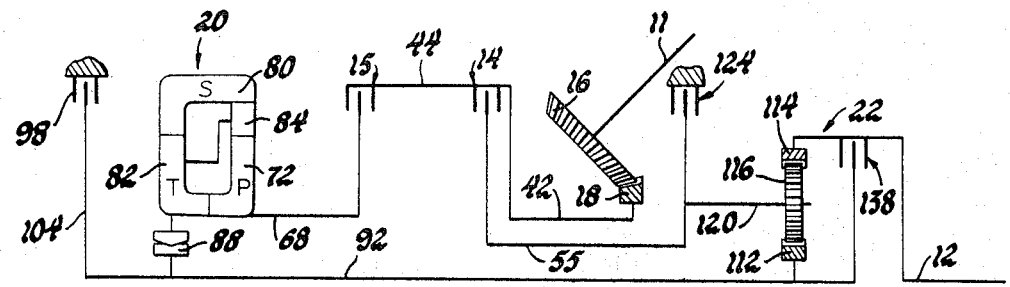
FIG. 2 is a schematic diagram of the gearing arrangement shown in FIG. 1.

The transmission shown in the diagrammatic view of FIG. 2 is the same as that described above for FIG. 1 and the corresponding parts have been given the same numerical designation.

To establish the first range forward drive, the clutch 138 is engaged. To establish the converter driven portion of this drive, the clutch 15 is engaged. Thus, in first range converter drive, the power flow is from the input shaft 11 through the bevel gear set 16, 18, the clutch 15, the converter 20, the one-way clutch 88 and the intermediate shaft 92 to the lockup clutch 138 and then to the output shaft 12. To remove the converter 20 from the power path, the clutch 14 is engaged while the clutch 15 is disengaged. Thus, the power flow is from the input shaft 11 through the bevel gear set 16, 18, clutch 14, intermediate shaft 55, carrier 120, and planetary set 22 to the output shaft 12. The one-way clutch 88 permits the intermediate shaft 92 which is driven at output speed to overrun the turbine member 82 so that converter elements remain stationary and do not absorb any power. To establish second range forward, the clutch 138 is disengaged and the brake 98 is engaged while the clutch 14 remains engaged. This establishes an overdrive ratio in the planetary set 22 since the sun gear 112 becomes a reaction member and the carrier 120 is an input member. Thus the power flow is from the input shaft 11 to the bevel gear set 16, 18, the input clutch 14, intermediate shaft 55 and carrier 120 to the ring gear 114 and then to the output shaft 12.

Reverse drive is established by engaging clutch 15 and brake 124. Brake 124 establishes the carrier 120 as a reaction member in the planetary gear set 22. Thus the ratio from sun gear 112 to ring gear 114 will be a reverse ratio. The power thus established is from the input shaft 11 through the bevel gear set 16, 18, input clutch 15, torque converter 20, one-way clutch 88 and intermediate shaft 92 to the sun gear 112 and then reversely to the ring gear 114 to the output shaft 12.

Figure 3:
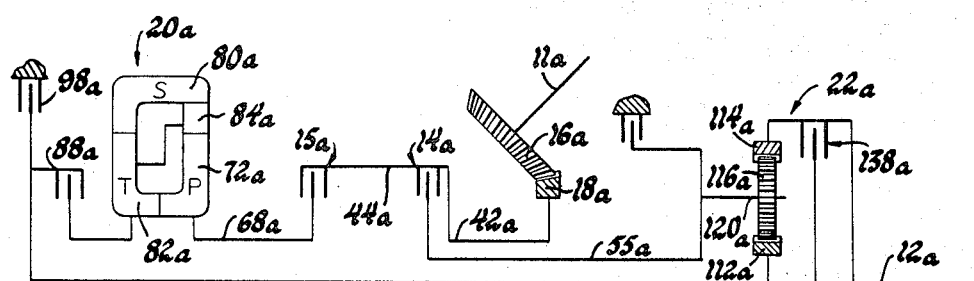
FIG. 3 is a modified schematic of the gearing arrangement shown in FIG. 1.

The transmission shown in diagrammatic view of FIG. 3 is similar to that shown above in FIG. 2. Therefore, corresponding parts will be given the same numerical designation with an *a* suffix. The transmission includes an input shaft 11*a* drivingly connected to a bevel gear 16*a* which meshes with another bevel gear 18*a* which is drivingly connected to a clutch hub 44*a* via a sleeve shaft 42*a*. The clutch drum 44*a* includes a direct input clutch 14*a* and a converter input clutch 15*a*. The converter input clutch 15*a* is connected via sleeve shaft 68*a* to the impeller 72*a* of the torque converter 20*a*. The direct input clutch 14*a* is connected via intermediate sleeve shaft 55*a* to the carrier 120*a* of the planetary gear set 22*a*.

The torque converter 20a has a turbine member 82a which is connected via a disc type friction clutch 88a to an intermediate shaft 92a. Also connected to the intermediate shaft 92a is an overdrive brake 98a. The opposite end of the intermediate shaft 92a is connected to a sun gear 112a of the planetary set 22a. The planetary set 22a also includes a pinion gear 116a rotatably mounted on the carrier 120a and meshing with the sun gear 112a and a ring gear 114a. The ring gear 114a is connected to the output shaft 12a and is selectively connectable to the sun gear 112a through a clutch 138a. The drive ranges of the transmission in FIG. 3 are identical to those described above for FIG. 2 with the exception that the clutch 88a replaces a one-way clutch 88 and, therefore, must be engaged to provide a converter drive and disengaged during direct drive.

Figure 4:
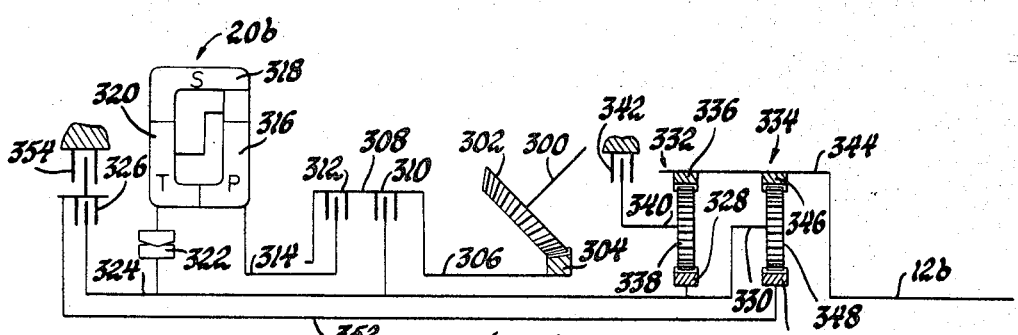
FIG. 4 is still another modified version of the gearing arrangement showing two planetary gear sets.

The transmission shown in FIG. 4 includes an input shaft 300 drivingly connected to a bevel gear 302 which meshes with a second bevel gear 304 which is connected via sleeve shaft 306 to a clutch drum 308. The clutch drum 308 houses a direct input clutch 310 and a converter input clutch 312. The converter input clutch 312 is connected via a shaft 314 to a pump 316 of a torque converter 20b. The torque converter 20b also has a stator 318 and a turbine 320. The turbine 320 is connected to a one-way clutch 322 which is connected to an intermediate sleeve shaft 324. Intermediate sleeve shaft 324 is connected to a lockup clutch 326 at the left end thereof and to a sun gear 328 and a carrier 330 at the right end thereof. The sun gear 328 and carrier 330 are members of the planetary gear sets 332 and 334 respectively. The planetary set 332 also includes a ring gear 336 and a pinion gear 338 which meshes with the sun gear 328 and the ring gear 336 and is rotatably mounted on a carrier 340 which is connected to a selectively operable disc brake 342. The ring gear 336 is connected via a hub 344 to a ring gear 346 of planetary set 334 and to an output shaft 12b. Also included in the planetary set 334 is a pinion gear 348 which meshes with the ring gear 346 and a sun gear 350 and is rotatably mounted on the carrier 330. The sun gear 350 is connected to an intermediate shaft 352 which is connected at its left end to the clutch 326 and to an overdrive brake 354.

This transmission also provides two forward drive ranges with the first forward drive range having a converter drive and a one-to-one drive in the planetary gear set and the second range having an overdrive in the planetary gear set. This transmission also provides a converter drive in reverse and a direct drive in reverse. To establish converter drive in the first range forward, the clutches 312 and 326 are engaged. The clutch 312 connects the input shaft 300 to the torque converter 20b and the clutch 326 connects the sun gear 350 and the carrier 330 together thus providing a lockup condition in the planetary set 334. The drive thus established is from the input shaft 300 through the clutch 312, the converter 20b, the lockup clutch 326, the planetary set 334 through the output shaft 12b. To establish direct drive in the first range, the clutch 312 is disengaged while the clutch 310 is engaged. The drive thus established is from the input shaft 300 through the clutch 310 bypassing the converter 20b to the clutch 326 and through the planetary set 334 to the output shaft 12b. The one-way clutch 322 permits the intermediate sleeve shaft 324 to overrun the turbine 320. To establish the second range forward, the clutch 326 is disengaged while the brake 354 is engaged. The brake 354 establishes the sun gear 350 as the reaction member in the planetary set 334. The drive thus established is from the input shaft 300, through the clutch 310 to the carrier 330. The drive is then from the carrier 330 to the ring gear 346 and the output shaft 12b. Again the one-way clutch 322 permits the sleeve shaft 324 to overrun the turbine 320.

To establish the converter reverse drive, clutch 312 is engaged and the brake 342 is engaged thus connecting the input to the torque converter and establishing the carrier 340 of planetary set 332 as a reaction member. The drive thus establishes from the input shaft 300 through clutch 312, torque converter 20b, intermediate shaft 324 through the sun gear 328 and then reversely through planetary gear set 332 to the output shaft 12b. To establish the direct reverse drive, clutch 312 is disengaged while the clutch 310 is engaged. The drive thus etsablishes from the input shaft 300 through clutch 310, sun gear 328, and then reversely through the planetary set 332 to the output shaft 12b. In this drive range, the torque converter is not used and thus does not absorb power from the system.

Figure 5:
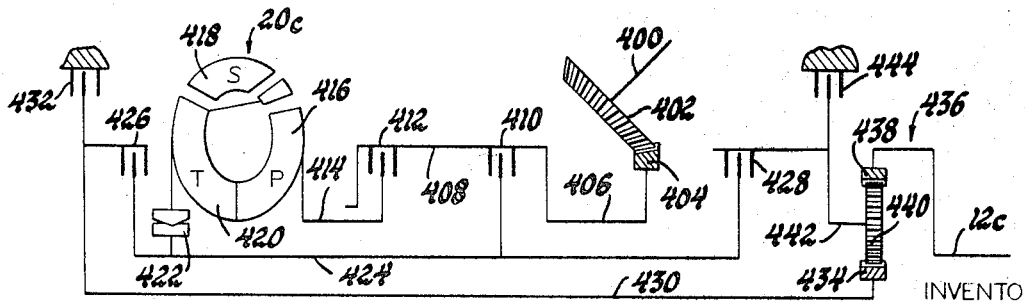
FIG. 5 is another modified diagrammatic view of the transmission.

The transmission shown in diagrammatic form in FIG. 5 provides the same drive ranges as the transmission shown in FIG. 4, that is, two reverse drives; however, the transmission in FIG. 5 accomplishes this result with a single planetary set.

The transmission includes an input shaft 400 drivingly connected to a bevel gear 402 which meshes with a second bevel gear 404 which is drivingly connected through a sleeve shaft 406 to a clutch drum 408. The clutch drum 408 houses a direct clutch 410 and a converter clutch 412. The converter clutch 412 is connected via a sleeve shaft 414 to a pump member 416 of a converter 20c. The converter 20c also has a stator member 418 and a turbine member 420 which is connected via a one-way clutch 422 to an intermediate sleeve shaft 424. The left end of the sleeve shaft 424 is connected to a selectively engageable clutch 426 and the right end of the sleeve shaft 424 is connected to a selectively operable clutch 428. The intermediate sleeve shaft is also connected to the direct clutch 410.

An intermediate shaft 430 is connected at its left end to the clutch 426 and to an overdrive brake 432 and at its right end is connected to a sun gear 434 which is a component of the planetary gear set 436. The planetary gear set 436 also includes a ring gear 438, pinion gears 440 meshing with the sun gear 434 and the ring gear 438 and rotatably mounted on a carrier 442. The carrier 442 is connected to the clutch 428 and to a selectively operable reverse brake 444. The ring gear 438 is connected to the output shaft 12c.

To establish the converter phase of the first forward drive range, the clutches 412, 426 and 428 are engaged. The clutches 426 and 428, when engaged at the same time, provide a connection between the carrier 442 and the sun gear 434 thus establishing a lockup or a one-to-one drive ratio in the planetary gear set 436. The drive thus established is from the input shaft 400 through clutch 412, the converter 20c, clutch 426, shafts 424 and 430 to the planetary set 436 and then to the output shaft 12c. To establish the direct drive phase of the first drive range forward, the clutch 410 is engaged while the clutch 412 is disengaged. The drive thus established is from the input shaft 400 through the clutch 410 to the intermediate sleeve shaft 424 and from the intermediate sleeve shaft 424 through clutches 426 and 428 to the planetary gear set 436 and then to the output shaft 12c. To establish second range forward, the clutch 426 is disengaged while the brake 432 is engaged. The brake 432 establishes the sun gear 434 as the reaction member in the planetary gear set 436 so that the carrier input and overdrive ratio is available in the planetary gear set. The drive thus established is from the input shaft 400 through the clutch 410, clutch 428, carrier 442, and from there to the output shaft 12c via the planetary gear set 436.

To establish first gear reverse, clutches 412 and 426 and a brake 444 are engaged while the remaining clutches and brakes are disengaged. When brake 444 is engaged, the carrier 442 is held stationary thus establishing the carrier as a reaction member in the planetary gear set 436 so that a sun gear input will produce a ring gear reverse output. The drive thus established from the input shaft 400 through clutch 412, converter 20c and clutch 426 to the sun gear 434 and then reversely through the planetary set 436 to the output shaft 12c. Second range reverse is established by engaging clutch 410 while disengaging clutch 412. The drive thus established is from the input shaft 400 through clutch 410, intermediate sleeve shaft 424, clutch 426 through the sun gear 434 and then reversely through the planetary set 436 to the output shaft 12c. The one-way clutch 422 provides a drive between the turbine 420 and the intermediate sleeve shaft 424 as long as the turbine 420 is rotating forwardly more rapidly than the intermediate sleeve shaft. However, when the intermediate sleeve shaft 424 is driven by the direct clutch 410, the one-way clutch 422 permits the sleeve shaft to overrun the turbine 420 so that no power absorption is accomplished by the torque converter.

It should be understood that the foregoing disclosure relates only to the preferred embodiments of the invention and that it is intended to cover all changes and modifications of the examples which will be apparent to persons skilled in the art.

What is claimed is:

1. An angle input power transmission comprising an input shaft; an output shaft extending transversely with respect to said input shaft; bevel gear means drivingly connected to said input shaft; clutch housing means operatively connected with said bevel gear means coaxial with said output shaft including selectively engageable direct clutch means, and converter clutch means; torque converter means including an impeller operatively connected with said converter clutch means, a stator member and a turbine; turbine clutch means operatively connected to said turbine; planetary gear means having sun gear means, ring gear means drivingly connected to said output shaft, a pinion gear meshing with said sun and ring gear means, and a carrier member rotatably supporting said pinion gear; intermediate sleeve shaft means drivingly connected between said direct clutch means and said carrier member for providing a direct drive from said input shaft to said carrier member when said direct clutch is engaged; intermediate shaft means drivingly connected between said turbine clutch means and said sun gear means for providing a converter drive from said input shaft to said sun gear means when both said turbine clutch and said converter clutch are engaged; reverse brake means operatively connected with said carrier member being selectively engageable to provide a reverse ratio in said planetary gear means; lockup clutch means operatively connected to said sun gear means and said ring gear means being selectively engageable to provide a one-to-one ratio in said planetary gear means; and overdrive brake means operatively connected to said intermediate shaft means being selectively engageable to provide an overdrive ratio in said planetary gear means.

2. An angle input power transmission comprising an input shaft; an output shaft having an axis extending transversely with respect to said input shaft; bevel gear means drivingly connected to said input shaft for directing input power at said input shaft into the direction of the axis of the output shaft; planetary gear means operatively connected with output shaft for providing a plurality of drive ratios; torque converter means having an input member and an output member and being operatively connected between said bevel gear means and said planetary gear means for providing torque multiplication; direct drive clutch means selectively engageable to directly connect said bevel gear means with said planetary gear means for providing a direct drive thereto; a pair of selectively operable converter clutch means on said input and output members for disconnecting said torque converter from said bevel gear means and said planetary gear means when said direct drive clutch means is engaged; overdrive brake means selectively operable to establish an overdrive ratio in said planetary gear means when said direct drive clutch means is engaged; and lockup clutch means selectively operable to provide a one-to-one drive in said planetary gear means when said overdive brake means is inoperable and either of said direct drive clutch means and said pair of converter clutch means is operable.

3. An angle input power transmission comprising an input shaft; an output shaft extending transversely with respect to said input shaft; bevel gear means drivingly connected to said input shaft; clutch housing means operatively connected with said bevel gear means coaxial with said output shaft including selectively engageable direct clutch means, and converter clutch means, torque converter means including an impeller operatively connected with said converter clutch means, a stator member and a turbine; turbine clutch means operatively connected to said turbine; planetary gear means having sun gear means, ring gear means drivingly connected to said output shaft, a pinion gear meshing with said sun and ring gear means, and a carrier member rotatably supporting said pinion gear; intermediate sleeve shaft means drivingly connected between said direct clutch means and said carrier member for providing a direct drive from said input shaft to said carrier member when said direct clutch is engaged; intermediate shaft means drivingly connected between said turbine clutch means and said sun gear means for providing a converter drive from said input shaft to said sun gear means when both said turbine clutch and said converter clutch are engaged; reverse brake means operatively connected with said carrier member being selectively engageable to provide a reverse ratio in said planetary gear means; and overdrive brake means operatively connected to said intermediate shaft means being selectively engageable to provide an overdrive ratio in said planetary gear means.

4. An angle input power transmission comprising an input shaft; an output shaft extending transversely with respect to said input shaft; bevel gear means drivingly connected to said input shaft; clutch housing means operatively connected with said bevel gear means coaxial with said output shaft including selectively engageable direct clutch means, and converter clutch means; torque converter means including an impeller operatively connected with said converter clutch means, a stator member and a turbine; turbine clutch means operatively connected to said turbine; planetary gear means having sun gear means, ring gear means drivingly connected to said output shaft, a pinion gear meshing with said sun and ring gear means, and a carrier member rotatably supporting said pinion gear; intermediate sleeve shaft means drivingly connected between said direct clutch means and said carrier member for providing a direct drive from said input shaft to said carrier member when said direct clutch is engaged; intermediate shaft means drivingly connected between said turbine clutch means and said sun gear means for providing a converter drive from said input shaft to said sun gear means when both said turbine clutch and said converter clutch are engaged; lockup clutch means operatively connected to said sun gear means and said ring gear means being selectively engageable to provide a one-to-one ratio in said planetary gear means; and overdrive brake means operatively connected to said intermediate shaft means being selectively engageable to provide an overdrive ratio in said planetary gear means.

5. An angle input power transmission comprising an input shaft; an output shaft extending transversely with respect to said input shaft; bevel gear means drivingly connected to said input shaft; clutch housing means operatively connected with said bevel gear means coaxial with said output shaft including selectively engageable direct clutch means, and converter clutch means; torque converter means including an impeller operatively connected with said converter clutch means, a stator member and a turbine; turbine clutch means operatively connected to said turbine; planetary gear means having a first input-reaction member, an output member drivingly connected to said output shaft, and a second input-reaction member; intermediate sleeve shaft means drivingly connected between said direct clutch means and said second input-reaction member for providing an input member for a direct drive from said input shaft to said planetary gear means when said direct clutch is engaged; intermediate shaft means drivingly connected between said turbine clutch means and said first input-reaction member for providing a converter drive from said input shaft to said planetary gear means when said both said turbine clutch and said converter clutch are engaged; reverse brake means operatively connected with said second input-reaction member being selectively engageable to provide a reaction member for a reverse ratio in said planetary gear means; lockup clutch means operatively connected to said first input-reaction member and said output member being selectively engageable to provide a one-to-one ratio in said planetary gear means; and overdrive brake means operatively connected to said intermediate shaft means being selectively engageable to provide a reaction member for an overdrive ratio in said planetary gear means.

6. An angle input power transmission comprising an input shaft; an output shaft extending transversely with respect to said input shaft; bevel gear means drivingly connected to said input shaft; clutch housing means operatively connected with said bevel gear means coaxial with said output shaft including selectively engageable direct clutch means, and converter clutch means; torque converter means including an impeller operatively connected with said converter clutch means, a stator member and a turbine; turbine clutch means operatively connected to said turbine; planetary gear means having sun gear means, ring gear means drivingly connected to said output shaft, a pinion gear meshing with said sun and ring gear means, and a carrier member rotatably supporting said pinion gear; intermediate sleeve shaft means drivingly connected between said direct clutch means and said carrier member for providing a direct drive from said input shaft to said carrier member when said direct clutch is engaged; intermediate shaft means drivingly connected between said turbine clutch means and said sun gear means for providing a converter drive from said input shaft to said sun gear means when both said turbine clutch and said converter clutch are engaged; and overdrive brake means operatively connected to said intermediate shaft means being selectively engageable to provide an overdrive ratio in said planetary gear means.

7. An angle input power transmission comprising an input shaft; an output shaft extending transversely with respect to said input shaft; bevel gear means drivingly connected to said input shaft; clutch housing means operatively connected with said bevel gear means coaxial with said output shaft including selectively engageable direct clutch means, and converter clutch means; torque converter means including an impeller operatively connected with said converter clutch means, a stator member and a turbine; turbine clutch means operatively connected to said turbine; planetary gear means having a first input-reaction member, an output member drivingly connected to said output shaft, and a second input reaction member; intermediate sleeve shaft means drivingly connected between said direct clutch means and said second input-reaction member for providing an input member for a direct drive from said input shaft to said planetary gear means when said direct clutch is engaged; intermediate shaft means drivingly connected between said turbine clutch means and said first input-reaction member for providing a converter drive from said input shaft to said planetary gear means when both said turbine clutch and said converter clutch are engaged; and overdrive brake means operatively connected to said intermediate shaft means being selectively engageable to provide a reaction member for an overdrive ratio in said planetary gear means.

References Cited

UNITED STATES PATENTS

| | | | |
|---|---|---|---|
| 3,039,326 | 6/1962 | Christenson | 74—688 |
| 3,080,772 | 3/1963 | Foerster | 74—688 |
| 3,270,586 | 9/1966 | Tuck et al. | 74—688 X |
| 3,371,557 | 3/1968 | Lammert | 74—688 X |
| 3,396,606 | 8/1968 | Tuck | 74—688 X |

ARTHUR T. McKEON, Primary Examiner